United States Patent
Bojic et al.

(10) Patent No.: US 11,978,335 B2
(45) Date of Patent: May 7, 2024

(54) CONTROLLING REMOTE DEVICES USING USER INTERFACE TEMPLATES

(71) Applicant: Google LLC, Mountain View, CA (US)

(72) Inventors: Miroslav Bojic, San Francisco, CA (US); Rohan Dhing, Mountain View, CA (US); Zhengnan Zhao, Sunnyvale, CA (US); Michael DelGaudio, San Francisco, CA (US); Henry Holland, London (GB); Mårten Jönsson, Malmö (SE); Ding Xu, Mountain View, CA (US); Henry Owen Newton-Dunn, Palo Alto, CA (US); Mikkel Crone Koser, Copenhagen (DK)

(73) Assignee: Google LLC, Mountain View, CA (US)

( * ) Notice: Subject to any disclaimer, the term of this patent is extended or adjusted under 35 U.S.C. 154(b) by 379 days.

(21) Appl. No.: 17/310,063

(22) PCT Filed: Jan. 21, 2019

(86) PCT No.: PCT/US2019/014403
§ 371 (c)(1),
(2) Date: Jul. 14, 2021

(87) PCT Pub. No.: WO2020/153933
PCT Pub. Date: Jul. 30, 2020

(65) Prior Publication Data
US 2022/0101719 A1  Mar. 31, 2022

(51) Int. Cl.
*G08C 17/02* (2006.01)
*H04L 67/51* (2022.01)
*H04W 4/80* (2018.01)

(52) U.S. Cl.
CPC ............. *G08C 17/02* (2013.01); *H04L 67/51* (2022.05); *H04W 4/80* (2018.02);
(Continued)

(58) Field of Classification Search
CPC ............... G08C 17/02; G08C 2201/30; G08C 2201/42; G08C 2201/93; G08C 2201/21;
(Continued)

(56) References Cited

U.S. PATENT DOCUMENTS 7,649,456 B2 * 1/2010 Wakefield .............. G08C 17/02
340/8.1
9,053,653 B2 * 6/2015 Myers ....................... G06F 3/14
(Continued)

FOREIGN PATENT DOCUMENTS

| EP | 2890059 A1 | 7/2019 |
| WO | 2017135599 A1 | 8/2017 |
| WO | 2018017660 A1 | 1/2018 |

OTHER PUBLICATIONS

Response to Office Action dated Jan. 24, 2023, from counterpart Indian Application No. 202147032371 filed Jul. 14, 2023, 18 pp.
(Continued)

*Primary Examiner* — Nam V Nguyen
(74) *Attorney, Agent, or Firm* — Shumaker & Sieffert, P.A.

(57) ABSTRACT

A method includes receiving, by a first computing device (110) and from a second computing device (118), using a short-range wireless communication unit of the first computing device (110), data including state information of the second computing device (118) and identification information for the second computing device (118). The method also includes, responsive to a distance between the first computing device (110) and the second computing device (118) satisfying a threshold distance, determining a particular template graphical user interface from a plurality of template graphical user interfaces. The method also includes determining one or more operations the second computing device (118) is configured to perform. The method further includes outputting a graphical user interface (114) associated with
(Continued)

the remote computing device (118). The method includes receiving a user input selecting a particular graphical element (130, 132, 134) of the graphical user interface (114) and transmitting, to the second computing device (118), an indication of an operation corresponding to the particular graphical element.

17 Claims, 5 Drawing Sheets

(52) U.S. Cl.
 CPC ..... *G08C 2201/30* (2013.01); *G08C 2201/42* (2013.01); *G08C 2201/93* (2013.01)
(58) Field of Classification Search
 CPC ... G08C 2201/91; H04L 67/51; H04L 67/131; H04L 12/2809; H04W 4/80; H04W 4/02; G06F 9/451; H04M 1/72415
 USPC ........................................................ 340/5.61
 See application file for complete search history.

(56) References Cited

U.S. PATENT DOCUMENTS

| | | | |
|---|---|---|---|
| 10,032,365 | B1 | 7/2018 | Xu et al. |
| 2010/0222000 | A1 | 9/2010 | Sauer et al. |
| 2014/0235265 | A1* | 8/2014 | Slupik .................. H04L 67/125 455/456.1 |
| 2014/0242913 | A1 | 8/2014 | Pang |
| 2014/0364056 | A1 | 12/2014 | Belk et al. |
| 2015/0077231 | A1 | 3/2015 | Kang et al. |
| 2015/0268903 | A1 | 9/2015 | Baba |
| 2017/0372600 | A1 | 12/2017 | Palin et al. |
| 2018/0047091 | A1 | 2/2018 | Ogden et al. |
| 2018/0058863 | A1 | 3/2018 | Meyer et al. |
| 2018/0165948 | A1 | 6/2018 | Shin |
| 2018/0239349 | A1 | 8/2018 | Rasmussen et al. |
| 2019/0006891 | A1 | 1/2019 | Park et al. |
| 2019/0045043 | A1* | 2/2019 | Kim ........................ H04W 4/12 |
| 2019/0097954 | A1 | 3/2019 | Hajdu et al. |
| 2019/0098444 | A1 | 3/2019 | Hwang et al. |
| 2019/0306245 | A1 | 10/2019 | Chandra et al. |
| 2020/0169427 | A1 | 5/2020 | Wu et al. |

OTHER PUBLICATIONS

Notice of Intent to Grant and Text Intended to Grant from counterpart European Application No. 19704696.4 dated Aug. 17, 2023, 49 pp.
Second Office Action from counterpart Chinese Application No. 201980089681.4 dated Feb. 16, 2023, 21 pp.
Response to Communication Pursuant to Rules 161(1) and 162 EPC dated Jul. 27, 2021, from counterpart European Application No. 19704696.4, filed Jan. 14, 2022, 19 pp.
First Examination Report from counterpart Indian Application No. 202147032371 dated Jan. 24, 2023, 6 pp.
International Preliminary Report on Patentability from International Application No. PCT/US2019/014403, dated Jul. 29, 2021, 10 pp.
First Office Action and Search Report, and translation thereof, from counterpart Chinese Application No. 201980089681.4 dated Oct. 17, 2022, 21 pp.
International Search Report & Written Opinion from Application No. PCT/US2019/014403, dated Oct. 10, 2019, 16 pp.

\* cited by examiner

CONTROLLING REMOTE DEVICES USING USER INTERFACE TEMPLATES

BACKGROUND

Typically, in order to control a remote computing device (e.g., a connected light, speaker, thermostat, etc.) from a mobile computing device (e.g., a smartphone), a user of the mobile computing device must perform numerous steps to configure communication between the mobile computing device and the remote computing device. For example, the user may download an application developed by the manufacturer of the remote computing device, create a user account for that application, and then initiate a communication session between the mobile computing device and the remote computing device (e.g., pair devices via BLUETOOTH, select a WIFI network, etc.). In addition, the user may need to perform similar steps for each remote computing device he or she wishes to control via the mobile computing device. Such interactions can be tedious, repetitive, and time consuming. Additionally, the user may be required to download a different application for each remote computing device. Utilizing different applications to control different remote computing devices may consume the limited resources of the computing device (e.g., by consuming memory and processing power).

SUMMARY

In general, the disclosed subject matter relates to techniques for enabling a computing device to control a plurality of different remote computing devices. A remote computing device may broadcast state information for any other computing device proximate to the remote computing device. For example, a mobile computing device (e.g., a smartphone) may receive the state information when the mobile computing device and the remote computing device are in proximity to one another (e.g., within a threshold distance of one another). In various instances, in response to receiving the state information, the mobile computing device may generate and display a graphical user interface (GUI) for controlling the remote device.

The mobile computing device may generate the GUI by selecting a template GUI from a plurality of template GUIs and populating the template GUI using at least a portion of the state information. For example, when the remote computing device is a clock, the state information may include information about one or more of a current time, an alarm state (e.g., set or not set), a time at which an alarm of the clock is set, and various operations that the clock can perform, such as adjusting the time at which an alarm is set. The GUI generated by the mobile computing device may include one or more graphical objects corresponding to the respective operations the remote computing is configured to perform. The mobile computing device may receive a user input selecting a graphical object corresponding to a particular operation, and may cause the remote computing device to perform the particular operation.

By generating GUIs associated with different remote computing devices using template GUIs, the mobile computing device may improve the user experience by allowing a user to more easily interact with and control remote different remote computing devices via the mobile computing device. For example, utilizing template GUIs enables the mobile computing device to control the different remote computing devices without utilizing different software applications for different types of remote computing devices (e.g., remote computing devices from different manufacturers). Rather than requiring a user to download and install different applications for each remote computing device, the mobile computing device may automatically generate GUIs to control a remote computing device when the mobile computing device is close to the remote computing device. Reducing the number of applications utilized to control different remote computing devices may reduce the computing resources consumed by the computing device. For instance, by reducing or eliminating the need to download or install different applications to control the remote computing devices, techniques of this disclosure may use less network bandwidth and less storage space than computing devices that have different applications installed for each remote computing device. Further, automatically generating GUIs based on template GUIs may enable the mobile computing device to receive fewer user inputs that may be otherwise required to search for an application, launch the application, and navigate through various GUIs of the application to control the remote computing device. By receiving fewer user inputs to control the remote computing device, the mobile computing device may utilize fewer processing cycles and reduce the amount of time a screen is on, which may reduce the amount of power consumed by the mobile computing device. Furthermore, selectively generating the GUI in dependence on proximity to a given remote computing device (for example, by reference to a threshold distance) can improve the control of the operation of remote computing devices by allowing intuitive access to such control at appropriate times. For example, this approach may reduce the possibility of accidentally operating a remote computing device other than that intended by the user.

In one example, a method includes receiving, by a first computing device and from a second computing device, using a short-range wireless communication unit of the first computing device, data including state information of the second computing device and identification information for the second computing device; responsive to a distance between the first computing device and the second computing device satisfying a threshold distance: determining, by the first computing device and based on the identification information, a particular template graphical user interface from a plurality of template graphical user interfaces; determining, by the computing device and based on the state information, one or more operations the second computing device is configured to perform; outputting, by the first computing device and using the particular template graphical user interface, a graphical user interface associated with the remote computing device and that includes one or more graphical elements that each correspond to a respective operation of the one or more operations the second computing device is configured to perform; receiving, by the first computing device, a user input selecting a particular graphical element of the one or more graphical elements; and transmitting, by the first computing device and to the second computing device, an indication of the operation corresponding to the particular graphical element.

In another example a computer-readable storage medium is described including instructions that, when executed, cause at least one processor of a first computing device to perform operations including: receiving, from a second computing device, using a short-range wireless communication unit of the first computing device, data including state information of the second computing device and identification information for the second computing device; responsive to a distance between the first computing device and the second computing device satisfying a threshold distance:

determining, based on the identification information, a particular template graphical user interface from a plurality of template graphical user interfaces; determining, based on the state information, one or more operations the second computing device is configured to perform; outputting, using the particular template graphical user interface, a graphical user interface associated with the remote computing device and that includes one or more graphical elements that each correspond to a respective operation of the one or more operations the second computing device is configured to perform; receiving a user input selecting a particular graphical element of the one or more graphical elements; and transmitting, to the second computing device, an indication of the operation corresponding to the particular graphical element.

In another example, a computing system is described that includes at least one processor configured to perform operations including: receiving, from a second computing device, using a short-range wireless communication unit of the first computing device, data including state information of the second computing device and identification information for the second computing device; responsive to a distance between the first computing device and the second computing device satisfying a threshold distance: determining, based on the identification information, a particular template graphical user interface from a plurality of template graphical user interfaces; determining, based on the state information, one or more operations the second computing device is configured to perform; outputting, using the particular template graphical user interface, a graphical user interface associated with the remote computing device and that includes one or more graphical elements that each correspond to a respective operation of the one or more operations the second computing device is configured to perform; receiving a user input selecting a particular graphical element of the one or more graphical elements; and transmitting, to the second computing device, an indication of the operation corresponding to the particular graphical element.

In another example, a system is described including means for receiving, from a second computing device, data including state information of the second computing device and identification information for the second computing device; responsive to a distance between the first computing device and the second computing device satisfying a threshold distance: means for determining a particular template graphical user interface from a plurality of template graphical user interfaces; means for determining one or more operations the second computing device is configured to perform; means for outputting, using the particular template graphical user interface, a graphical user interface associated with the remote computing device and that includes one or more graphical elements that each correspond to a respective operation of the one or more operations the second computing device is configured to perform; means for receiving a user input selecting a particular graphical element of the one or more graphical elements; and means for transmitting, to the second computing device, an indication of the operation corresponding to the particular graphical element.

The details of one or more examples are set forth in the accompanying drawings and the description below. Other features, objects, and advantages of the disclosure will be apparent from the description and drawings, and from the claims.

DETAILED DESCRIPTION

Figure 1:
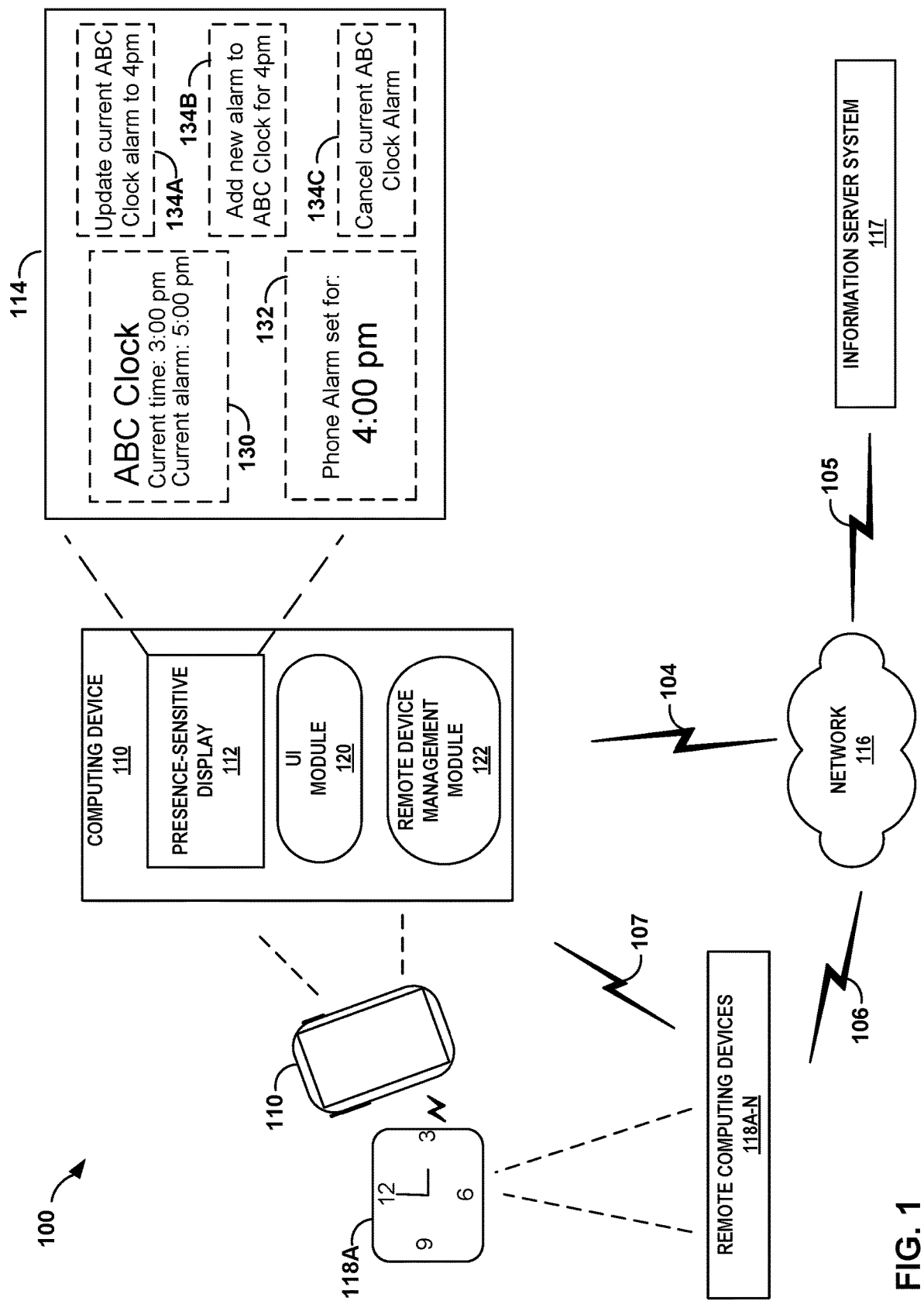
FIG. 1 is a conceptual diagram illustrating an example system that dynamically generates graphical interfaces for controlling remote computing devices, in accordance with one or more aspects of the present disclosure.

FIG. 1 is a conceptual diagram illustrating an example computing system 100 that dynamically generates graphical interfaces for controlling remote computing devices, in accordance with one or more aspects of the present disclosure. In the example of FIG. 1, system 100 includes mobile computing device 110, information server system (ISS) 117, and one or more remote computing devices 118A-N (collectively, remote computing devices 118) that are communicatively coupled with each other.

Network 116 represents any public or private communications network for transmitting data between computing systems, servers, and computing devices. Network 116 may be a wireless network (e.g., cellular, WIFI, and/or other wireless network), a wired network (e.g., a local area network (LAN), a wide area network (WAN), the Internet, etc.), or any other type of communications network. Network 116 may include one or more network hubs, network switches, network routers, or any other network equipment, that are operatively inter-coupled thereby providing for the exchange of information between computing device 110, ISS 117, and remote computing devices 118. Computing device 110, ISS 117, and remote computing devices 118 may transmit and receive data across network 116 using any suitable communication techniques.

Computing device 110, ISS 117, and remote computing devices 118 may each be operatively coupled to network 116 using respective network links 104, 105, and 106. Computing device 110, ISS 117, and remote computing devices 118 may be operatively coupled to network 116 using different network links. The links coupling computing device 110, ISS 117, and remote computing devices 118 to network 116 may be Ethernet, ATM or other types of network connections, and such connections may be wireless and/or wired connections.

Remote computing devices 118 may be any type of computing device, such as a smartphone, a computerized wearable device (e.g., a watch, eyewear, ring, necklace, etc.), speaker, television, automobile head unit, clock, thermostat, household appliance (e.g., stove, refrigerator, washing machine, etc.), countertop computing device, or any other type of device that is configured to send and receive information to and from computing device 110 via a network, such as network 116. Remote computing devices 118 may exchange information with computing device 110 via network 116. For example, remote computing devices 118 may send information to computing device 110 and may receive information from computing device 110. Remote computing devices 118 may also exchange information with computing device 110 without traversing network 116, for example, using direct link 107. Direct link 107 may be any communication protocol or mechanism capable of enabling two computing devices to communicate directly (i.e., without requiring a network switch, hub, or other intermediary network device), such as BLUETOOTH, WIFI DIRECT, near-field communication, etc.

ISS 117 represents any suitable remote computing system, such as one or more desktop computers, laptop computers, mainframes, servers, cloud computing systems, etc. capable of sending and receiving information via a network, such as network 116. ISS 117 may represent a cloud computing system that provides information to computing device 110 and/or remote computing devices 118 via network 116. In some examples, ISS 117 outputs information to computing device 110, such that computing device 110 may output at least a portion of the information provided by ISS 117 to a user.

Computing device 110 may be a mobile device, such as a smart phone, a tablet computer, a laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, or any other types of wearable and non-wearable, mobile or non-mobile computing devices.

As shown in FIG. 1, computing device 110 includes a presence-sensitive display (PSD) 112, user interface (UI) module 120, and remote device management module (RDMM) 122. Modules 120 and 122 may perform operations described using software, hardware, firmware, or a mixture of hardware, software, and firmware residing in and/or executing at computing device 110. Computing device 110 may execute modules 120 and 122 with multiple processors or multiple devices. Computing device 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may detect input from a user of computing device 110. For example, PSD 112 may detect one or more gestures performed on or within a threshold distance of PSD 112 (e.g., a user touching PSD 112 with a finger or a stylus or moving the finger or stylus within a threshold distance of a surface of PSD 112).

PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110. PSD 112 may output information (e.g., to a user) as a user interface (e.g., graphical user interface 114), which may be associated with functionality provided by computing device 110. For example, PSD 112 may display various user interfaces related to an application module or other features of computing platforms, operating systems, applications, and/or services executing at or accessible from computing device 110.

UI module 120 manages user interactions with PSD 112 and other components of computing device 110. For example, UI module 120 may cause PSD 112 to display graphical user interface (GUI) 114 as a user of computing device 110 views output and/or provides input at PSD 112. UI module 120 may receive information from a component of computing device 110 that forms a basis for some or all of GUI 114. In response, UI module 120 may output instructions and information to PSD 112 that cause PSD 112 to display GUI 114 according to the information received from the component of computing device 110. UI module 120 may receive one or more indications of input from a user as the user interacts with the user interfaces (e.g., GUI 114). When handling input detected by PSD 112, UI module 120 may receive information from PSD 112 in response to inputs detected at locations PSD 112 that correspond to locations of PSD 112 at which elements of GUI 114 are displayed.

UI module 120 disseminates information about inputs detected by PSD 112 to other components of computing device 110 for interpreting the inputs and for causing computing device 110 to perform one or more functions in response to the inputs. For example, UI module 120 may generate one or more touch events based on the detected input. A touch event may include information that characterizes user input, such as a location component (e.g., [x,y] coordinates) of the user input, a time component (e.g., when the user input was received), a force component (e.g., an amount of pressure applied by the user input), or other data (e.g., speed, acceleration, direction, density, etc.) about the user input. Based on location information of the touch events generated from the user input, UI module 120 may determine that the detected user input is associated with RDMM 122 and may send an indication of the one or more touch events to RDMM 122 for further interpretation.

In accordance with techniques of this disclosure, RDMM 122 may dynamically enable a user of computing device 110 to control remote computing devices 118. In contrast to some computing devices which utilize a plurality of different applications that each correspond to a respective remote computing 118, in some examples, RDMM 122 enables the user of computing device 110 to control remote computing devices 118 without utilizing different applications to control each of the different remote computing devices 118. In contrast to some computing devices which require a user to configure communication between the computing device and a remote computing device to control the remote computing device, RDMM 122 may enable the user of computing device 110 to control remote computing devices 118 without configuring computing device 110 to communicate with each of remote computing devices 118 separately.

In some examples, each remote computing device of remote computing devices 118 broadcasts or transmits information associated with the respective remote computing device. For example, remote computing device 118A may broadcast the information by outputting an electromagnetic energy wave (e.g., radio wave, also referred to as a radio signal, or an optical wave, also referred to as an optical signal) that includes the information associated with remote computing device 118A, such as identification information and state information for remote computing device 118A. Examples of state information include information indicative of one or more characteristics of the remote computing device, operations the remote computing device is configured to perform, location (e.g., GPS coordinates, a room within a house, etc.), among others.

In the example of FIG. 1, remote computing device 118A includes a clock. In some examples, the characteristics of the clock may include a time to which remote computing device 118A is currently set (e.g., the current time according to the clock) and a time for which one or more alarms of remote computing device 118A is set. Similarly, remote computing device 118A may be configured to performing operations such as updating an alarm, creating a new alarm, cancelling an existing alarm, silencing an alarm, or updating the time to which the clock is set (e.g., update the current time kept by the clock).

In some examples, remote computing device 118A broadcasts information over a short-range communication unit using a short-range communication protocol, such as near-field communication (NFC), WIFI DIRECT, BLUETOOTH Low Energy (BLE), or ultrasound. Remote computing device 118A may be configured to broadcast information at fixed time intervals (e.g., once every half second, once every second, etc.) or at variable time intervals. For example, remote computing device 118A may transmit information at a first time interval (e.g., once every second) when computing device 110 is not proximate to remote computing device 118A and broadcast information at a second, different time interval (e.g., five times per second) when computing device 110 and remote computing device 118A are in proximity of one another.

Computing device 110 may receive the data broadcast by remote computing device 118A using a short-range wireless communication unit of computing device 110. For example, one or more communication units of computing device 110 may operate according to an NFC, WIFI DIRECT, or BLE protocol.

RDMM 122 automatically outputs a GUI associated with remote computing device 118A when the distance between remote computing device 118A and computing device 110 satisfies (e.g., is less than or equal to) a threshold distance. The threshold distance may be a distance at which communication unit 246 can detect a signal broadcast by remote computing device 118A, such that, in some examples, RDMM 122 may automatically output a GUI associated with remote computing device 118A in response to detect a signal broadcast by remote computing device 118A. In another example, RDMM 122 may be a predetermined distance and RDMM 122 may determine whether the distance between remote computing device 118A and computing device 110 satisfies the threshold distance.

In one example, RDMM 122 may determine whether the distance satisfies the threshold distance based at least in part on the characteristics of the signal (e.g., a radio signal or an optical signal) that includes the information broadcast by remote computing device 118A. The characteristics of the signal may include a strength of the signal or an amount of time between when the signal was sent by remote computing device 118A and when the signal was received by computing device 110.

As another example, RDMM 122 may determine whether the distance between computing device 110 and remote computing device 118A satisfies the threshold distance based on the information received from remote computing device 118A. For example, RDMM 122 may receive information indicating the location of remote computing device 118A (e.g., GPS coordinates, a room in which device 118A is located, etc.), compare the location of remote computing device 118A to the location of computing device 110, and determine whether the distance between computing device 110 and remote computing device 118A satisfies the threshold distance based on the comparison. For instance, RDMM 122 may determine that the distance satisfies the threshold distance when computing device 110 and remote computing device 118A are in the same building, room, or other enclosed space.

In some examples, RDMM 122 determines whether the distance between computing device 110 and remote computing device 118A satisfies the threshold distance based on the characteristics of the signal that includes the information broadcast by remote computing device 118A and the information received from remote computing device 118A. In one example, RDMM 122 determines the distance satisfies the threshold distance in response to determining that strength of the signal satisfies a threshold signal strength and the location of remote computing device 118A is located in the same building as computing device 110.

Responsive to the distance between computing device 110 and remote computing device 118A satisfying (e.g., being less than) a threshold distance, RDMM 122 may output at least a portion of the state information received from remote computing device 118A. For example, RDMM 122 may cause PSD 112 to output a GUI (e.g., GUI 114) associated with remote computing device 118A that enables a user of computing device 110 to interact with remote compute device 118A.

In some instances, RDMM 122 utilizes a template GUI to display at least a portion of the state information for remote computing device 118A. Utilizing a template GUI may enable RDMM 122 to generate a GUI associated with the remote computing device 118A without requiring an application associated with remote computing device 118A to be downloaded or installed at computing device 110. Similarly, utilizing a template GUI may enable RDMM 122 to generate a GUI associated with different remote computing device, such as remote computing device 118B, without an application associated with remote computing device 118B installed at computing device 118. In this way, utilizing template GUIs may enable computing device 110 to control different applications without having different applications installed at computing device 110 for each type of remote computing device 118, which may reduce the amount of computing resources (e.g., memory, processing cycles, battery power) utilized by computing device 110 to control different remote computing devices 118.

RDMM 122 may select a template GUI from a plurality of template GUIs to display at least a portion of the state information associated with remote computing device 118A. In some examples, computing device 110 stores information for (e.g., data used to generate) one or more template GUIs. In another example, RDMM 122 receives information for one or more template GUIs from ISS 117.

RDMM 122 may select a template GUI based on the identification information for remote computing device 118A, a state of computing device 110, or a combination thereof. In some examples, the identification information for remote computing device 118A indicates a type of the remote computing device 118A. As used herein, a type of remote computing device may refer to a model, manufacturer, or appliance type (e.g., household appliance, clock, thermostat). For example, RDMM 122 may select a first template from the plurality of templates when the type indicates remote computing device 118A was manufactured by a first manufacturer and may select a second template from the plurality of templates when the type indicates remote computing device 118A was manufactured by a second (e.g., different) manufacturer. As another example, RDMM 122 may select a first template when the type indicates remote computing device 118A is of a first appliance (e.g., kitchen appliance) and a second template when the type indicates remote computing device 118A is of a second class (e.g., laundry appliance). In one example, RDMM 122 determines a type of remote computing device 118A based on the identification information and requests a template GUI associated with that type of remote computing device from ISS 117.

In another example, RDMM 122 selects the template GUI based at least in part on an operating state of computing device 110. The state of computing device 110 may include a lock status (e.g., locked vs unlocked) or a display status (e.g. a state of what is shown or displayed by PSD 112). For example, RDMM 122 may select a first template GUI when the status of PSD 112 includes displaying a home screen GUI (e.g., a GUI corresponding to a home screen of the operating system executing at computing device 110) or a second template GUI when the status of PSD 112 includes displaying an application GUI (e.g., a GUI corresponding to an application executing at computing device 110).

In some instances, RDMM 122 generates GUI 114 associated with remote computing device 118A based on the selected template GUI. For instance, RDMM 122 may generate GUI 114 by populating the selected template GUI with information associated with operations that remote computing device 118A is configured to perform.

RDMM 122 may determine one or more operations the remote computing device 118A is configured to perform. In some examples, RDMM 122 determines the one or more operations based on the state information received from remote computing device 118A. For instance, the state information may specify a set of operations remote computing device 118A is configured to perform. In some examples, remote computing device 118A specifies a different set of operations in the state information based on an operating state of remote computing device 118A. For example, remote computing device 118A include a smart display and may output data indicative of a first set of operations when the operating state of remote computing device 118A includes playing a video (e.g., the operations may include pause, play, fast forward, etc.) and output data indicative of a second set of operations when the operating state of remote computing device 118A includes displaying a picture slide show (e.g., the operations may include "show pictures of place A", "show pictures of event B", etc.).

In some examples, remote computing device 118A specifies a different set of operations in the state information based on a relationship between computing device 110 and remote computing device 118A. For example, remote computing device 118A may output state information indicating a different set of operations to computing device 110 based on a location of computing device 110 relative to remote computing device 118A or a distance between devices 110 and 118A, among other relationships. In one example, remote computing device 118A includes a vehicle infotainment system and includes data indicative of different sets of operations within the state information based on a location of computing device 110. For example, remote computing device 118A may indicate that it is configured to perform a first set of operations (e.g., output audio for a phone call, provide navigation information, output multimedia (e.g., music)) when computing device 110 is located in a predetermined location within the vehicle (e.g., on the center console) and that it is configured to perform a second set of operations (e.g., provide navigation information or output multimedia, but not output audio associated with phone calls) when computing device 110 is not located in the predetermined location. In such examples, computing device 110 is permitted to command remote computing device 118A to output audio for a phone call when computing device 110 is located on the center console (e.g., only the driver's phone call place calls through the infotainment system) and may be permitted to command remote computing device to perform other operations when located elsewhere, such as display navigation information (e.g., which may allow people other than the driver to send navigation instructions to the infotainment system). In this way, remote computing device 118A may restrict its functionality to certain devices based on a relationship between computing device 110 and remote computing device 118A.

In one example, RDMM 122 determines the one or more operations that remote computing device 118A is configured to perform based on the identification information for remote computing device 118A. For example, RDMM 122 may query a data store (e.g., stored by computing device 110 or ISS 117) based on the identification information and may receive, in response to the query, information indicating a set of operations remote computing device 118A is configured to perform.

In the example of FIG. 1, GUI 114 includes a plurality of graphical elements 130, 132, and 134A-134C. Examples of graphical elements include textboxes, images, icons, etc. As illustrated in FIG. 1, graphical elements 134A-134C (collectively, graphical elements 134) may each include information indicative of one or more respective operations that remote computing device 118A is configured to perform. In some examples, graphical element 130 includes identification information for remote computing device 118A and/or state information for remote computing device 118A. In the example of FIG. 1, the identification information displayed by graphical element 130 indicates a type of the remote computing device 118A (e.g., "ABC clock," "analog clock," "digital clock," "clock," etc.). As illustrated in FIG. 1, the state information displayed by graphical element 130 includes the time to which remote computing device 118A is set (also referred to as a current time, e.g., 3:00 pm) and a time for which an alarm of remote computing device 118A is set (e.g., 5:00 pm). Graphical element 132 may include information indicative of a state of computing device 110 (e.g., a time for which an alarm of computing device 110 is set. Responsive to generating GUI 114, RDMM 122 outputs GUI 114 to UI module 120, which causes PSD 112 to display GUI 114.

After displaying GUI 114, PSD 112 may detect a user input and UI module 120 may interpret the input to determine a display location of PSD 112 at which the input was detected and determine whether any of graphical elements 134 are located at that location. UI module 120 may determine that a particular graphical element 134 (e.g., graphical element 134A) was displayed at the location of PSD 112 where the user input was detected, and may output data indicating that graphical element 134A was selected to RDMM 122.

RDMM 122 may receive the data indicating that graphical element 134A was selected, determine an operation corresponding to the selected graphical element 134A, and transmit an indication of the operation corresponding to the selected graphical element. For instance, in the example of FIG. 1, RDMM 122 determines that graphical element 134A corresponds to an operation of remote computing device 118A to update the time for which the current alarm is set to 4 μm and outputs a command indicative of the operation to update the current alarm. In some examples, RDMM 122 outputs the command to remote computing device 118A. As another example, RDMM 122 may output the command to ISS 117 which may forward an indication of the command (e.g., the command itself, or data representing the command) to remote computing device 118A. Responsive to receiving the command, remote computing device 118A may perform the operation included in the command. For example, remote computing device 118A may update the time for which the alarm is set from 3 μm to 4 pm.

In this way, the techniques of the disclosure may enable a computing device to output GUIs associated with respective remote computing devices based on template GUIs. By generating GUIs based on template GUIs, the computing device may improve the user experience by allowing a user to interact with remote computing devices more easily. For instance, the computing device may enable a user to control the respective remote computing devices without requiring a specific application associated with each respective remote computing device. Reducing the number of applications utilized to interact with and control remote computing devices may reduce the amount of computing resources (e.g., memory, processing cycles, battery power, etc.) utilized by the computing device. For instance, reducing the number of applications needed to control the remote computing devices may enable a computing device to use less storage space than computing devices that have different applications installed for each remote computing device. Further, automatically generating GUIs based on template GUIs may enable the mobile computing device to receive fewer user inputs that may be otherwise required to search for an application, launch the application, and navigate through various GUIs of the application to control the remote computing device. Further, the techniques of this disclosure may enable a computing device to control a remote computing device without requiring an initial setup of communication between the computing device and a remote computing device to communicate with one another, the techniques of this disclosure may reduce the number of user inputs received by the computing device, which may reduce the time a display is turned on and the number of inputs received. In this way, the computing device may execute fewer operations and/or turn off the display more quickly, hence reducing the power consumed by the computing device. Further, enabling the computing device to control the remote computing device without the performing an initial communication setup may improve the user experience. Furthermore, selectively generating the GUI in dependence on proximity to a given remote computing device (for example, by reference to a threshold distance) can improve the control of the operation of remote computing devices by allowing intuitive access to such control at appropriate times. For example, this approach may reduce the possibility of accidentally operating a remote computing device other than that intended by the user.

Figure 2:
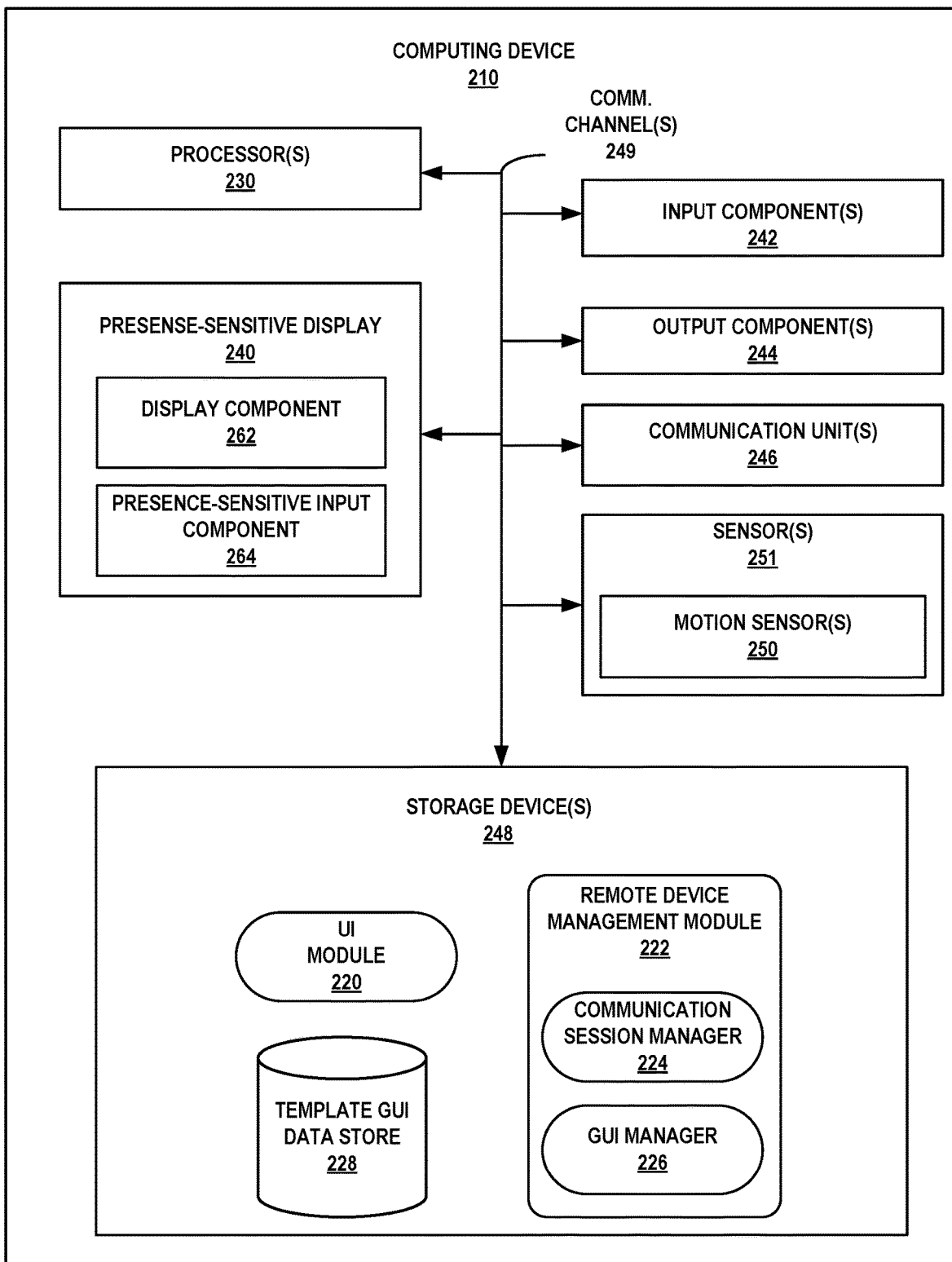
FIG. 2 is a block diagram illustrating an example computing device that is configured to dynamically generate graphical interfaces for controlling remote computing devices, in accordance with one or more aspects of the present disclosure.

FIG. 2 is a block diagram illustrating an example computing device that is configured to dynamically generate task shortcuts, in accordance with one or more aspects of the present disclosure. Computing device 210 is a more detailed example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes one or more processors 230, presence-sensitive display 240, one or more input components 242, one or more output components 244, one or more communication units 246, one or more storage devices 248, and motion sensors 250. Storage devices 248 of computing device 210 include UI module 220, RDMM 222, and template GUI data store 228.

Communication channels 249 may interconnect each of the components 230, 240, 242, 244, 246, 248, and/or 250 for inter-component communications (physically, communicatively, and/or operatively). In some examples, communication channels 249 may include a system bus, a network connection, one or more inter-process communication data structures, or any other components for communicating data (also referred to as information).

One or more communication units 246 of computing device 200 may communicate with external devices by transmitting and/or receiving data. For example, computing device 200 may use one or more of communication units 246 to transmit and/or receive radio signals on a radio network such as a cellular radio network. In some examples, communication units 246 may transmit and/or receive satellite signals on a satellite network such as a Global Positioning System (GPS) network. Examples of communication units 246 include a network interface card (e.g. such as an Ethernet card), an optical transceiver, a radio frequency transceiver, a GPS receiver, or any other type of device that can send and/or receive information. Other examples of communication units 246 may include short wave radios (e.g., NFC, BLUETOOTH (including BLE)), GPS, 3G, 4G, 5G, and WIFI radios found in mobile devices as well as Universal Serial Bus (USB) controllers and the like.

One or more input components 242 of computing device 210 may receive input. Examples of input are tactile, audio, kinetic, and optical input, to name only a few examples. Input components 242 of computing device 210 include, in one example, a mouse, keyboard, voice responsive system, video camera, buttons, control pad, microphone or any other type of device for detecting input from a human or machine. In some examples, input component 242 may be a presence-sensitive input component, which may include a presence-sensitive screen, touch-sensitive screen, etc.

One or more output components 244 of computing device 210 may generate output. Examples of output are tactile, audio, and video output. Output components 244 of computing device 210, in some examples, include a presence-sensitive screen, sound card, video graphics adapter card, speaker, cathode ray tube (CRT) monitor, liquid crystal display (LCD), or any other type of device for generating output to a human or machine. Output components may include display components such as cathode ray tube (CRT) monitor, liquid crystal display (LCD), Light-Emitting Diode (LED) or any other type of device for generating tactile, audio, and/or visual output.

In some examples, presence-sensitive display 240 of computing device 210 may include functionality of input component 242 and/or output components 244. In the example of FIG. 2, presence-sensitive display 240 may include a presence-sensitive input component 264, such as a presence-sensitive screen or touch-sensitive screen. In some examples, presence-sensitive input component 264 may detect an object at and/or near the presence-sensitive input component. As one example range, presence-sensitive input component 264 may detect an object, such as a finger or stylus that is within two inches or less of presence-sensitive input component 264. Presence-sensitive input component 264 may determine a location (e.g., an (x,y) coordinate) of the presence-sensitive input component at which the object was detected. In another example range, presence-sensitive input component 264 may detect an object two inches or less from presence-sensitive input component 264 and other ranges are also possible. Presence-sensitive input component 264 may determine the location of presence-sensitive input component 264 selected by a user's finger using capacitive, inductive, and/or optical recognition techniques.

In some examples, presence-sensitive display 240 may also provide output to a user using tactile, audio, or video stimuli as described with respect to output component 244. For instance, presence-sensitive display 240 may include display component 262 that displays a graphical user interface (e.g., GUI 114 of FIG. 1). Display component 262 may be any type of output component that provides visual output, such as described with respect to output components 244. While illustrated as an integrated component of computing device 210, presence-sensitive display 240 may, in some examples, be an external component that shares a data or information path with other components of computing device 210 for transmitting and/or receiving input and output. For instance, presence-sensitive display 240 may be a built-in component of computing device 210 located within and physically connected to the external packaging of computing device 210 (e.g., a screen on a mobile phone). In another example, presence-sensitive display 240 may be an external component of computing device 210 located outside and physically separated from the packaging of computing device 210 (e.g., a monitor, a projector, etc. that shares a wired and/or wireless data path with a tablet computer). In some examples, presence-sensitive display 240, when located outside of and physically separated from the packaging of computing device 210, may be implemented by two separate components: a presence-sensitive input component 264 for receiving input and a display component 262 for providing output.

One or more storage components 248 within computing device 210 may store information for processing during operation of computing device 210 (e.g., computing device 210 may store data accessed by modules 220, 222, 224, and 226 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage components 248 may store program instructions and/or information (e.g., data) associated with modules 220, 222, 224, and 226. Storage components 248 may include a memory configured to store data or other information associated with modules 220, 222, 224, and 226, and data store 228.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 224, and 226 may be operable by processors 240 to perform various actions, operations, or functions of computing device 210. For example, processors 240 of computing device 210 may retrieve and execute instructions stored by storage components 248 that cause processors 240 to perform the operations described herein that are attributed to modules 220, 222, 224, and 226. The instructions, when executed by processors 240, may cause computing device 210 to store information within storage components 248.

UI module 220 may include all functionality of UI module 120 of computing device 110 of FIG. 1 and may perform similar operations as UI module 120 for managing a user interface (e.g., user interface 114) that computing device 210 provides at PSD 212 for handling input from, and output to, a user. For example, UI module 220 may generate instructions or commands to cause PSD 212 to display user interface 114 and the elements thereof. UI module 220 may be part of or associated with an operating platform of computing device 210. For example, UI module 220 may be a sub-module, service, or activity of an operating system of computing device 210 as opposed to being a module or application of computing device 210 that is separate from the computing platform or operating system computing device 210.

RDMM 222 may include all functionality of RDMM 122 of computing device 110 of FIG. 1 and may perform similar operations as RDMM 122 for dynamically generating graphical user interfaces to enable a user of computing device 210 to control remote computing devices 118 of computing device 210. RDMM 222 may communicate with external systems and devices, such as remote computing devices 118 and ISS 117, to provide a GUI for interacting with remote computing devices 118.

In some examples, one or more communication units of communication units 246 receives data broadcast by a remote computing device (e.g., remote computing device 118A). In other words, computing device 210 receives a message broadcast by remote computing device 118A. Computing device 210 receives the message broadcast by remote computing device 118A without receiving a user input commanding the computing device 210 to establish a communication session with the remote computing device 118A. In one example, communication units 246 receive a short-wave radio signal that includes data from remote computing device 118A, such as identification information of remote computing device 118A and state information for remote computing device 118A. Communication unit 246 outputs the data received from remote computing device 118A to RDMM 222 to enable a user of computing device 210 to control remote computing device 118A.

Communication session manager (CSM) 224 of RDMM 222 may automatically establish a wireless communication session between computing device 210 and remote computing device 118A when the distance between computing device 210 and remote computing device 118A satisfies (e.g., is less than) a threshold distance. For example, CSM 224 may communicatively couple remote computing device 118A and computing device 210 using a BLUETOOTH or WIFI DIRECT communication protocol without receiving a user input to communicatively couple device 210 and 118A. In some examples, the threshold distance at which CSM 224 establishes the communication session is a distance at which communication unit 246 can detect a signal broadcast by remote computing device 118A.

GUI manager 226 of RDMM 222 automatically generates a GUI associated with remote computing device 118A when the distance between computing device 210 and remote computing device 118A satisfies a threshold distance. In some examples, the threshold distance at which GUI manager 226 generates the GUI associated with remote computing device 118A is a distance at which communication unit 246 can detect a signal broadcast by remote computing device 118A. In one example, communication units 246 includes an NFC reader and GUI manager 226 automatically generates a GUI associated with remote computing device 118A in response to receiving a signal at the NFC reader. Stated yet another way, because the threshold distance may be a distance at which communication unit 246 can detect a signal broadcast by remote computing device 118A, GUI manager 226 may generate the GUI associated with remote computing device 118A without determining a distance between computing device 210 and remote computing device 118A.

While computing device 210 may not determine a distance between computing device 210 and remote computing device 118A, in some instances, computing device 210 may determine a distance between computing device 210 and remote computing device 118. In some examples, CSM 224 determines the distance based on one or more characteristics of the signal received from remote computing device 118A, the information received from remote computing device 118A, characteristics of computing device 210, or a combination thereof. The characteristics of the signal may include a strength of the signal, an amount of time between when the signal was sent by remote computing device 118A and when the signal was received by computing device 210, among others. In some examples, the information received from remote computing device 118A may include information indicating a current location of remote computing device 118A (e.g., GPS coordinates or a building or room in which remote compute computing device 118A is located), or a power or signal strength of the signal output by remote computing device 118A (e.g., which may indicate an approximate broadcast distance for remote computing device 118A). In some examples, the characteristics of computing device 210 include a current location of computing device 210. In one example, characteristics of computing device 210 include a type of communication unit 246 (e.g., which may indicate a distance at which communication unit 246 can detect a signal or a threshold signal strength at which a signal is detectable), among others.

CSM 224 may determine the distance between computing device 210 and remote computing device 118A based additionally or alternatively on data received from one or more sensors 251. Sensors 251 may include an image sensor (e.g., a camera), an optical sensor, an infrared sensor, an ultrasonic sensor, among others. In some examples, CSM 224 receives image data from an image sensor and determines a distance between computing device 210 and remote computing device 118A based on the image data. As one example, CSM 224 may identify remote computing device 118A within an image (e.g., using image recognition techniques), determine a number of pixels for remote computing device 118A, and determine a distance to remote computing device 118A based on the number of pixels. In some instances, CSM 224 may cause one or more sensors to emit a signal (e.g., light, sound, etc.) and determine a distance between computing device 210 and remote computing device 118A based on a reflection of the emitted signal (also referred to as a return signal).

In one scenario, after determining the distance between computing device 210 and remote computing device 118A, CSM 224 compares to distance to a threshold distance to determine whether that the distance between computing device 210 and remote computing device 118A satisfies the threshold distance.

The threshold distance at which GUI manager 226 automatically generates the GUI associated with remote computing device 118A may be the same or different from the threshold distance at which CSM 224 automatically establishes a wireless communication session between computing device 210 and remote computing device 118A. For example, CSM 224 may establish the communication session when the distance between computing device 210 and remote computing device 118A satisfies (e.g., is less than) a first threshold distance (e.g., 5 meters) and GUI manager 226 may generate the GUI associated with remote computing device when the distance between computing device 210 and remote computing device 118A satisfies a second threshold distance (e.g., 1 meter). For example, GUI manager 226 may refrain from initiating output of a GUI associated with remote computing device 118A until the distance between computing device 210 and remote computing device 118A satisfies a second (e.g., closer or smaller) threshold distance. In other words, in some instances, GUI manager 226 does not cause PSD 212 to display the GUI associated with remote computing device 118A until computing device 210 and remote computing device 118A are closer to one another. Utilizing different thresholds may enable computing device 210 to establish the communication session in the background without interrupting interactions between computing device 210 and the user, and to enable computing device 210 to quickly and seamlessly communicate with remote computing device 118A when the distance between devices 210 and 118A gets within a second (e.g., closer) threshold distance.

GUI manager 226 may generate the GUI associated with remote computing device 118A in response to determining that the distance between computing device 210 and remote computing device 118A satisfies a threshold distance. GUI manager 226 generates, in some examples, a GUI associated with remote computing device 118A using a template GUI.

In some examples, GUI manager 226 selects a template GUI from a plurality of template GUIs to display at least a portion of the state information associated with remote computing device 118A. GUI manager 226 may select a template GUI from the plurality of template GUIs based on the identification information for remote computing device 118A, an operating state of computing device 210, or a combination thereof. The identification information may indicate a type (e.g., model, manufacturer, appliance type) of remote computing device 118. In one example, the type of computing device indicates remote computing device 118A is a household appliance (e.g., kitchen appliance, such as a dishwasher or oven; a laundry appliance, such as a clothes washer, clothes dryer; or utility appliance, such as HVAC, water softener, etc.), vehicle, among others. In another example, the class of remote computing device may refer to a clock, a thermostat, a boat, an automobile, etc. The operating state of computing device 210 may include a lock status or display status of computing device 210.

GUI manager 226 generates a GUI associated with remote computing device 118A using the selected template GUI. Computing device 210 may store information for (e.g., data used to generate) one or more plurality of template GUIs in template GUI data store 228. For example, template GUI data store 228 may include information indicating a display location for each of the template GUIs, a display size for each template GUI (e.g., number of pixels), size, location, and/or number of graphical elements within the template GUI, formatting information (e.g., font type, size, color, etc.) of the graphical elements, and so forth). In another example, GUI manager 226 queries another computing device (e.g., ISS 117) for the information associated with a template GUI.

In some examples, GUI manager 226 populates the template GUI with the information associated with operations that remote computing device 118A is configured to perform. GUI manager 226 determines one or more operations that remote computing device 118A is configured to perform based on the identification information for remote computing device 118A, the state information for remote computing device 118A, or both. In one instance, the state information received by computing device 210 may include data that indicates the set of operations that remote computing device 118A is configured to perform, and GUI manager 226 may parse the state information for remote computing device 118A to determine a set of operations that remote computing device 118A is configured to perform. In another instance, GUI manager 226 may determine a set of operations that remote computing device 118A is configured to perform by query data store 230 based on the identification information for remote computing device 118A. In yet another instance, RDM 222 may query ISS 117 based on the identification information to determine a set of operations that remote computing device 118A is configured to perform.

Responsive to generating the GUI associated with remote computing device 118A (e.g., GUI 114 of FIG. 1), GUI manager 226 outputs the GUI to UI module 220, which causes PSD 212 to display the GUI associated with remote computing device 118A. In some examples, the GUI associated with remote computing device 118A includes a plurality of graphical elements (e.g., textboxes, images, icons, etc.). In some examples, the graphical elements of GUI 114 include information indicative of one or more respective operations that remote computing device 118A is configured to perform, identification information for remote computing device 118A, and/or state information for remote computing device 118A. In one example, GUI 114 associated with remote computing device 118A includes graphical elements 134 that each include information indicative of one or more respective operations that remote computing device 118A is configured to perform, graphical element 132 that includes information indicative of a state of computing device 110 (e.g., a time for which an alarm of computing device 110 is set, and graphical element 130 that includes identification information for remote computing device 118A and/or state information for remote computing device 118A

CSM 224 may, in some examples, output a command to remote computing device 118A to perform an operation in response to receiving a user input selecting a graphical element (e.g., graphical element 134A of GUI 114 of FIG. 1) corresponding to an operation that remote computing device 118A is configured to perform. Presence-sensitive input component 264 of PSD 212 may detect a user input selecting a graphical element 134A of the GUI associated with remote computing device 118A that is displayed by display component 262 of PSD 212. UI module 220 may interpret the input to determine a display location of PSD 212 at which the input was detected and determine whether any of graphical elements associated with operations of remote computing device 118A (e.g., graphical element 134A of FIG. 1) are located at that location. UI module 220 may determine that a particular graphical element 134A associated with a particular operation of remote computing device 118A was displayed at the location of PSD 212 where the user input was detected, and may output data indicating that graphical element 134A was selected to RDMM 222.

Responsive to receiving data indicating that a particular graphical element 134A of the GUI associated with remote computing device 118A was selected, CSM 224 of RDMM 222 determines an operation corresponding to the selected graphical element 134A and transmits an indication of the operation to remote computing device 118A. For example, CSM 224 may output a command to perform the operation corresponding to the selected graphical element. CSM 224 may output the command to remote computing device 118A using one of communication units 246. In some examples, CSM 224 outputs the command using one of communication units 246 that is different than the communication unit 246 that received a signal used to determine the distance between computing device 210 and remote computing device 118A. For example, computing device 210 may determine a distance between computing device 210 and remote computing device 118A based on a signal received (e.g., that includes an initial message or broadcast) from remote computing device 118A using one communication unit 246 (e.g., using NFC), and output the command to perform the operation using a different communication unit (e.g., using BLUETOOTH or WIFI DIRECT).

In some examples, computing device 210 may output a command to perform an operation to remote computing device 118A in response to determining that computing device 210 has physically contacted remote computing device 118A. CSM 224 may determine that determine that computing device 210 has physically contacted remote computing device 118A based on motion sensor data generated by one or more motion sensors 250 and communication data received by one or more of communication units 246. Examples of motion sensors 250 include accelerometers and gyroscopes, among others. In one scenario, CSM 224 determines that computing device 210 contacted an object in response to receiving motion data (e.g., accelerometer data) that indicates computing device 210 traveled in a first direction (e.g., as computing device 210 travels toward remote computing device 118A) during a first time interval followed by a sharp change in direction during a second time interval (e.g., in a substantially opposite direction after computing device 210 reflects or bounces off remote computing device 118A). CSM 224 may determine that computing device 210 and remote computing device 118A are within a threshold distance of one another based on data received from remote computing device 118A using one of communications units 246 (e.g., an NFC reader). In one example, CSM 224 may determine that computing device 210 physically contacted remote computing device 118A in response to determining that computing device 210 contacted an object and the computing device 210 and remote computing device 118A are within a threshold distance. In response to determining that computing device 210 physically contacted remote computing device 210, computing device 210 may output a command to perform a predetermined operation associated with physical contact between the devices.

In some examples, CSM 224 may output a command to perform an operation to remote computing device 118A via ISS 117 of FIG. 1, such that ISS 117 may forward an indication of the command (e.g., the command itself, or data representing the command) to remote computing device 118A. Responsive to receiving the command, remote computing device 118A may perform the operation included in the command.

After outputting or transmitting the command indicating the operation to be performed by remote computing device 118A, GUI manager 226 may update the GUI associated with remote computing device 118A. In some examples, GUI manager 226 may update the graphical user interface associated with remote computing device 118A in response to receiving an updated message from remote computing device 118A. For instance, in response to commanding remote computing device 118A to update the time for which an alarm is set, remote computing device 118A may update the time to which the alarm is set and may broadcast a message indicating the updated information (e.g., update state information, such as the updated time to which the alarm is now set) for remote computing device 118A. GUI manager 226 may receive the updated message with updated information for remote computing device 118A and may update GUI 114 based on the updated information. For example, GUI manager 226 may receive data from remote computing device 118A indicating the time for which the alarm is set and update GUI 114 to include the updated time for the alarm.

GUI manager 226 may output another GUI that does not include information associated with remote computing device 118A when the distance between computing device 210 and remote computing device 118A no longer satisfies the threshold distance. In other words, CSM 224 may terminate the communication session and GUI manager 226 may automatically cause PSD 212 to remove the information associated remote computing device 118A from the user interface displayed by PSD 212 when the distance no longer satisfies the threshold distance. Said yet another way, PSD 212 may automatically output a GUI associated with remote computing device 118A when a user of computing device 210 brings computing device 210 and remote computing device 118A to within a threshold distance of one another, and may automatically remove the GUI associated with computing device 118A from the interface displayed by PSD 212 when the user of computing device 210 separates computing device 210 and remote computing device 118A by at least the threshold distance. As one example, in an example where computing device 118A includes an alarm clock, rather than requiring a user of computing device 210 to open an application and navigate through various screens or menus to control the alarm clock, GUI manager 226 may automatically output a GUI associated with the alarm clock that enables a user of computing device 210 to update the alarm clock (e.g., set alarms, change times for which alarms are set, change the current time, silence alarms, etc.) when the user approaches the alarm clock, and may automatically remove the GUI associated with the alarm clock as the user walks away from the alarm clock.

In some examples, GUI manager 226 removes the information associated with remote computing device 118A from the user interface displayed by PSD 212 in response to a user input indicating a command to remove the information associated with remove computing device 118A from the user interface. For example, PSD 212 may detect a tap, swipe, or other user input indicative of a command to remove the information associated with remote computing device 118A from the user interface, and GUI manager 226 of may interpret the user input and cause PSD 212 to remove the information associated with remote computing device 118A from the GUI. As another example, GUI manager 226 removes the GUI associated with remote computing device 118A in response to determining that the user has not interacted with the GUI associated with remote computing device 118A within a threshold amount of time.

FIGS. 3A-3D are conceptual diagrams illustrating an example graphical user interfaces presented by an example computing device that is configured to dynamically generate graphical interfaces for controlling remote computing devices, in accordance with one or more aspects of the present disclosure. FIGS. 3A-3D are described below in the context of system 100 of FIG. 1.

Figure 3B:
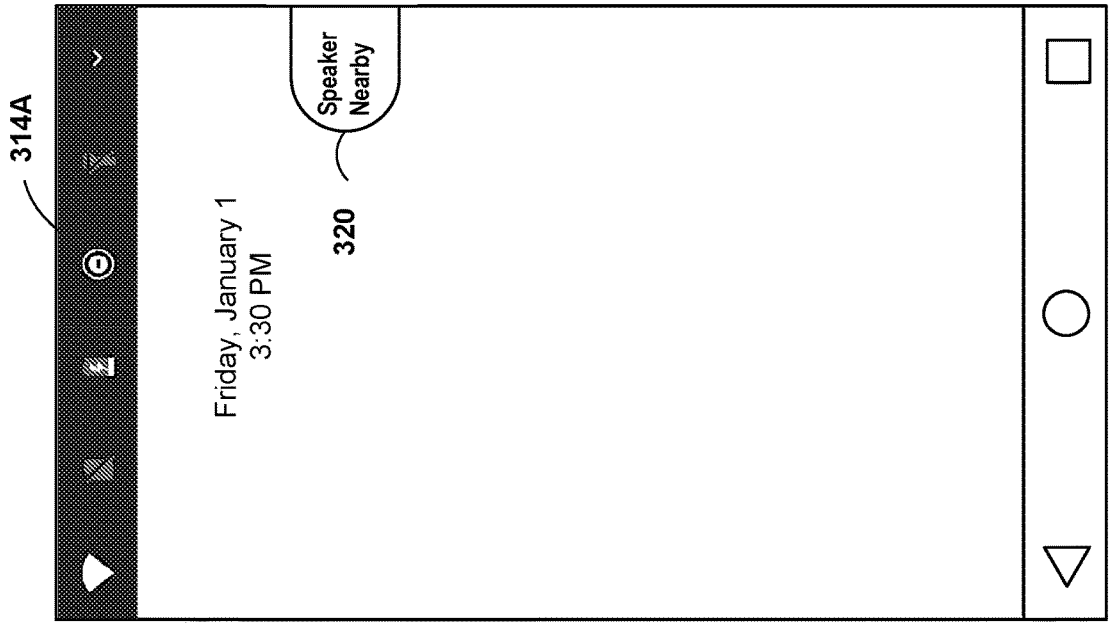
FIGS. 3A-3D are conceptual diagrams illustrating example graphical user interfaces of an example computing device, in accordance with one or more aspects of the present disclosure.
Figure 3A:
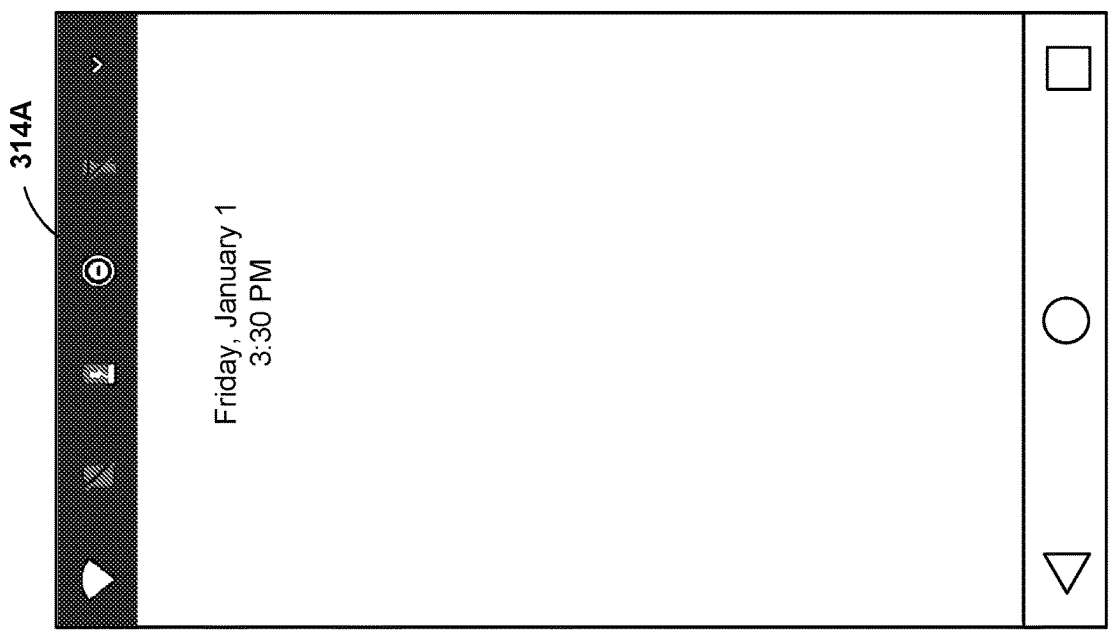
Figure 3D:
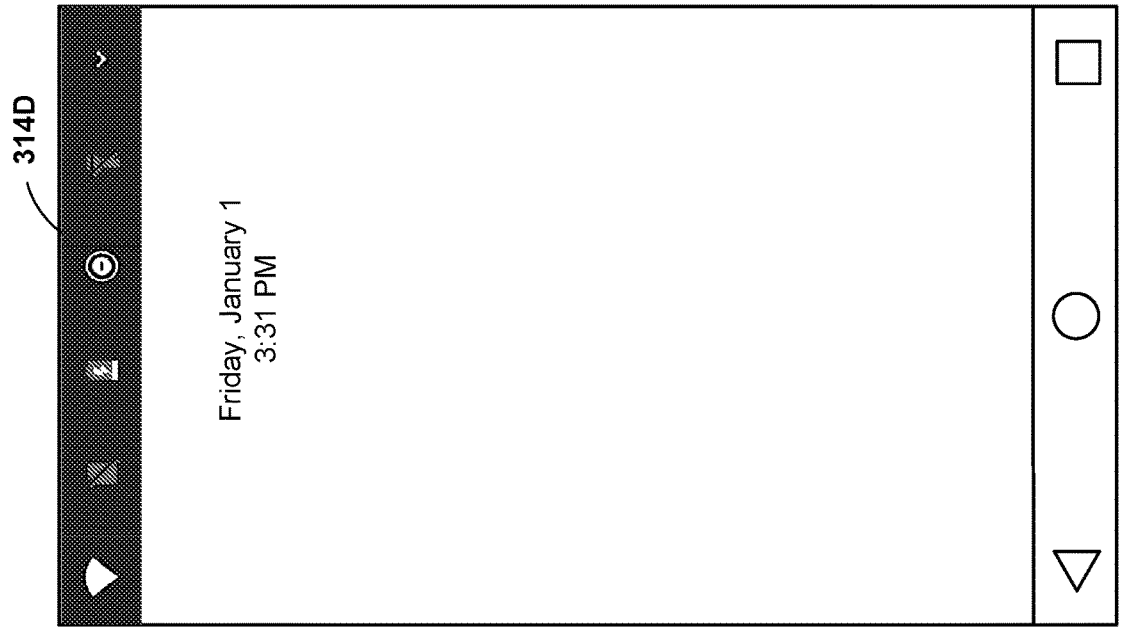

In the example of FIG. 3A, computing device 110 outputs a GUI 314A. GUI 300A may include information associated with an application executing at computing device 110 and/or an operating system executing at computing device 110. In the example of FIG. 3A, GUI 300A includes information for a home screen of the operating system executing at computing device 110.

As described above, computing device 110 may receive information broadcast by a remote computing device (e.g., a countertop speaker) 118A of FIG. 1 and automatically output GUI 314B associated with a remote computing device 118A when the distance between computing device 110 and remote computing device 118A satisfies a threshold distance. For example, when the distance satisfies the threshold distance, computing device 110 may automatically establish a communication session between computing device 110 and remote computing device 118A without user input and output GUI 314B. GUI 314B includes graphical element 320 associated with remote computing device 118A. In the example of FIG. 3B, graphical element 320 indicates that remote computing device 118A is within a threshold distance of computing device 210.

Figure 3C:
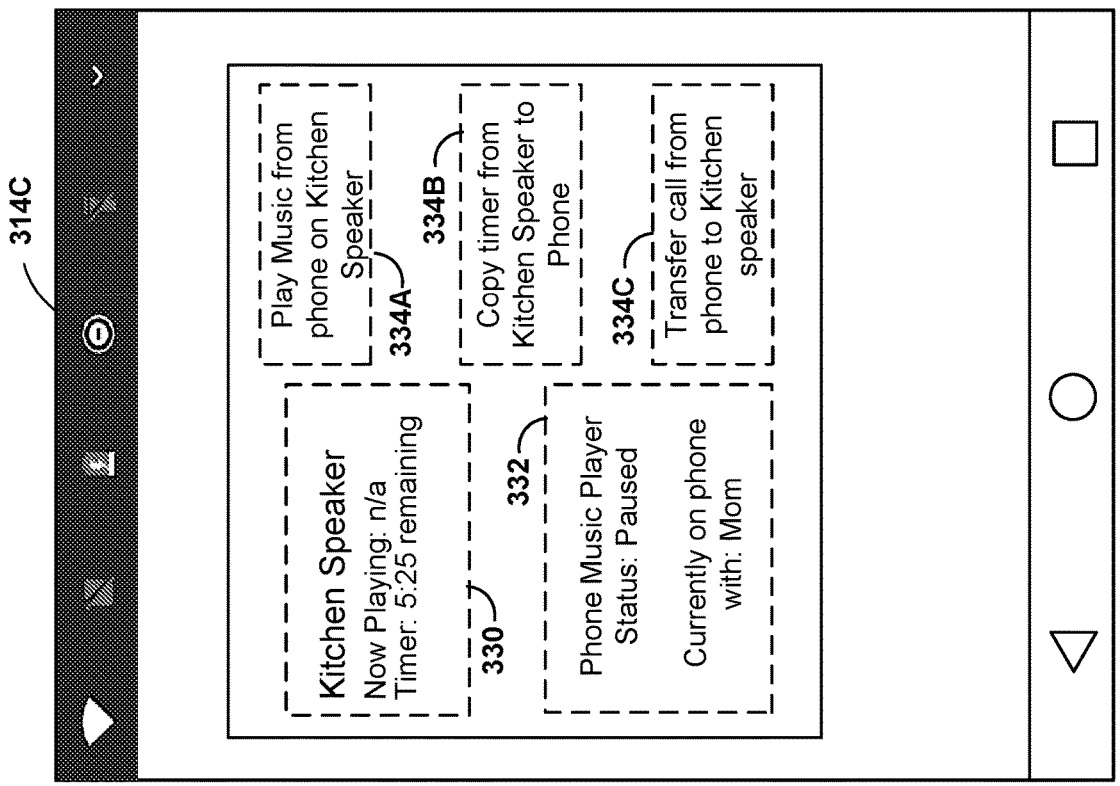

As illustrated in FIG. 3C, computing device 110 outputs GUI 314C associated with remote computing device 118A. In some examples, computing device 110 outputs GUI 314C in response to receiving a user input selecting graphical element 320 of FIG. 3B. In another example, computing device 110 may output GUI 314C when the distance between computing device 110 and remote computing device 118A satisfies (e.g., is less than) a different threshold distance. Computing device 110 generates GUI 314A based on a template GUI and information associated with one or more operations that remote computing device 118A is configured to perform. In the example of FIG. 3C, GUI 314C includes graphical elements 334A-334C (collectively, graphical elements 334) which may include information indicative of one or more respective operations that remote computing device 118A is configured to perform. In some examples, graphical element 330 includes identification information for remote computing device 118A and/or state information for remote computing device 118A. In the example of FIG. 3C, the identification information displayed by graphical element 330 indicates a type of the remote computing device 118A (e.g., "Kitchen Speaker," "Smart Display," "Sound Bar," etc.). As illustrated in FIG. 3C, the state information displayed by graphical element 330 includes an indication of what (if any) audio is currently being output by remote computing device 118A and an amount of time left on a timer kept by remote computing device 118A (e.g., 5:25 remaining). Graphical element 332 may include information indicative of one a state of computing device 110 (e.g., a status of a music player and/or a status of a call). Responsive to generating GUI 314C, RDMM 122 outputs GUI 314C to UI module 120, which causes PSD 112 to display GUI 314C.

Computing device 110 may output a GUI 300D that does not include information associated with remote computing device 118A when the distance between remote computing device 118A and computing device 110 no longer satisfies a threshold distance (e.g., either the first threshold distance or the second threshold distance). For example, computing device 110 may terminate the communication session between computing device 110 and remote computing device 110 and may remove the information associated with remote computing device 118A from the GUI displayed by PSD 112.

Figure 4:
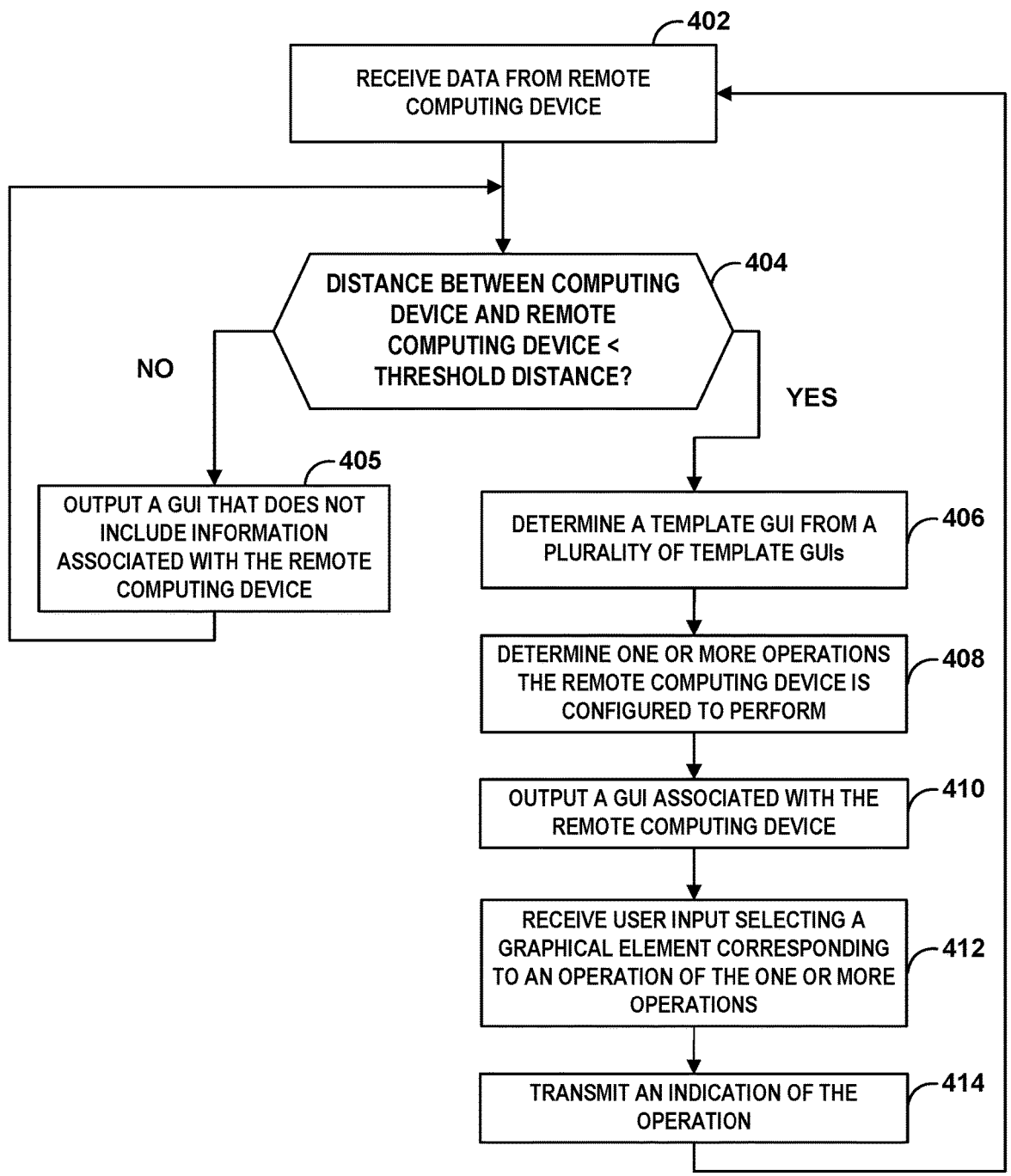
FIG. 4 is a flowchart illustrating example operations performed by an example computing device that is configured to dynamically generate task shortcuts, in accordance with one or more aspects of the present disclosure.

FIG. 4 is a flowchart illustrating example operations performed by an example computing device that dynamically generate graphical interfaces for controlling remote computing devices, in accordance with one or more aspects of the present disclosure. FIG. 4 is described in the context of FIG. 1.

Computing device 110 receives data via a signal from remote computing device 118A using a short-wave wireless communication unit (402). The data received from remote computing device 118A may include state information of the remote computing device 118A and identification information for the remote computing device 118A. Examples of state information include information indicative of one or more characteristics of remote computing device 118A, operations remote computing device 118A is configured to perform, or both.

Computing device 110 may determine whether a distance between computing device 110 and remote computing device 118A satisfies (e.g., is less than) a threshold distance (404). In some examples, computing device 110 determines a distance between computing device 110 and remote computing device 118A based on one or more characteristics of the signal received from remote computing device 118A and/or the data include in the signal. For instance, computing device 110 may determine the distance based on the strength of the signal, a time for the signal to travel between remote computing device 118A and computing device 110, location information included in the signal, or a combination thereof. Responsive to determining that the distance does not satisfy the threshold distance ("NO" branch of 404), computing device 110 may output a GUI that does not include information associated with remote computing device 118A (405) (e.g., by continuing to output the same GUI as displayed immediately prior to determining that the distance does not satisfy the threshold distance) and re-calculate the distance to determine whether the distance satisfies the threshold distance.

In the example of FIG. 4, computing device 110 determines a particular template GUI from a plurality of template GUIs (406) in response to determining that the distance satisfies the threshold distance ("YES" branch of 404). Computing device 110 may determine or select a particular GUI based on the identification information received from remote computing device 118A, a state of computing device 110, or both. For example, computing device 110 may select different template GUIs depending on the state of computing device 110 (e.g., unlocked vs locked, displaying a home screen GUI for the operating system vs an application GUI associated with an application installed at computing device 110). As another example, computing device 110 may select different template GUIs based on the type of remote computing device 118A (e.g., clock, radio, household appliance, vehicle, etc.).

Computing device 110 determines, in some examples, one or more operations that remote computing device 118A is configured to perform (408). As one example, computing device 110 determines the one or more operations based on the state information for remote computing device 118A. For example, the state information may specify a set of operations remote computing device 118A is configured to perform. As another example, computing device 110 may determine the operations remote computing device 118A is configured to perform based on the identification information for remote computing device 118A. For example, computing device 110 may determine a type of remote computing device 118A based on the identification information and may determine operations remote computing device 118A is configured to perform based on the type.

Computing device 110 outputs a GUI (e.g., GUI 114) that includes one or more graphical elements that each correspond to a respective operation that remote computing device 118A is configured to perform (410). For example, the determined template GUI includes one or more graphical elements for respective operations that remote computing device 118A is configured to perform, and computing device 110 generates the GUI 114 associated with remote computing device 118A by populating the graphical elements of the particular template GUI with information indicative of one or more respective operations that remote computing device 118A is configured to perform.

After displaying GUI 114 associated with remote computing device 118A, computing device 110 may receive a user input selecting a particular graphical element of the one or more graphical elements (412). For example, PSD 112 may detect a user input selecting a graphical element of GUI 114 and computing device 110 may determine the operation of remote computing device 118A that is associated with the selected graphical element.

In the example of FIG. 4, computing device 110 transmits an indication of the operation corresponding to the particular graphical element to remote computing device 118A (414). Computing device 110 may transmit or output data indicative of the operation to remote computing device directly or indirectly (e.g., via ISS 117). For example, computing device 110 may output a command to remote computing device 118A to perform the operation associated with the selected graphical element using the same short-range wireless communication unit that received the data from remote computing device 118A or a different short-range wireless communication. In some examples, computing device 110 receives the data from remote computing device 118A using a first short-range wireless communication unit (e.g., using the NFC protocol) and transmits the command to remote computing device using a second, different short-range wireless communication unit (e.g., using a BLUETOOTH or a WIFI DIRECT protocol). Responsive to transmitting the indication of the operation to remote computing device 118A, computing device 110 may receive updated data (e.g., a second signal) from remote computing device 118A (e.g., using either the first short-range wireless communication unit or the second short-range wireless communication unit).

In one or more examples, the functions described may be implemented in hardware, hardware and software, hardware and firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   receiving, by a first computing device and from a second computing device, using a short-range wireless communication unit of the first computing device, data including state information of the second computing device and identification information for the second computing device;
   responsive to a distance between the first computing device and the second computing device satisfying a threshold distance:
      establishing a communication session between the first computing device and the second computing device;
      determining, by the first computing device and based on the identification information, a particular template graphical user interface from a plurality of template graphical user interfaces;
      determining, by the first computing device and based on the state information, one or more operations the second computing device is configured to perform;
      outputting, by the first computing device and using the particular template graphical user interface, a graphical user interface associated with the second computing device and that includes one or more graphical elements that each correspond to a respective operation of the one or more operations the second computing device is configured to perform;
      receiving, by the first computing device, a user input selecting a particular graphical element of the one or more graphical elements; and
      transmitting, by the first computing device and to the second computing device via the communication session, an indication of the operation corresponding to the particular graphical element; and
   after transmitting the indication of the operation to the second computing device and responsive to the distance between the first computing device and the second computing device no longer satisfying the threshold distance:
      terminating the communication session; and
      outputting, by the first computing device, an updated graphical user interface that does not include the graphical user interface associated with the second computing device.

2. The method of claim 1, further comprising:
   determining, by the first computing device, the distance between the first computing device and the second computing device; and
   determining, by the first computing device, whether the distance between the first computing device and the first computing device satisfies the threshold distance.

3. The method of claim 2, wherein determining the distance between the first computing device and the second computing device comprises determining, by the first computing device, the distance between the first computing device and the second computing device based on a characteristic of a signal received by the short-range wireless communication unit, the signal including the state information and the identification information.

4. The method of claim 3,
   wherein the short-range wireless communication unit is a first short-range wireless communication unit, and
   wherein transmitting the indication of the operation corresponding to the particular graphical element includes transmitting, by the first computing device and using a second short-range wireless communication unit, the indication of the operation corresponding to the particular graphical element.

5. The method of claim 1, wherein receiving the state information and the identification information includes automatically receiving the state information and identification information without receiving a user input commanding the first computing device to establish the communication session with the second computing device.

6. The method of claim 1, wherein the threshold distance is a first threshold distance, the method further comprising:
further responsive to the distance between the first computing device and the second computing device satisfying the first threshold distance, outputting a graphical element indicating the first computing device is within the first threshold distance; and
responsive to the distance between the first computing device and the second computing device satisfying a second threshold distance, outputting the graphical user interface that includes the one or more graphical elements that each correspond to a respective operation the second computing device is configured to perform.

7. The method of claim 1, wherein the threshold distance is a second threshold distance, and wherein the communication sessions is a wireless communication session, the method further comprising:
responsive to the distance between the first computing device and the second computing device satisfying a first threshold distance, automatically establishing, by the first computing device, the wireless communication session between the first computing device and the second computing device and temporarily refraining from initiating output of the graphical user interface associated with the second computing device,
wherein outputting the graphical user interface includes outputting the graphical user interface in response to determining that the distance between the first computing device and the second computing device satisfies the second threshold distance, the second threshold distance being less than the first threshold distance.

8. The method of claim 1,
detecting, by the first computing device, physical contact between the first computing device and the second computing device, wherein physical contact between the first computing device and the second computing device is associated with a predetermined operation of the one or more operations the second computing device is configured to perform; and
responsive to detecting the physical contact, transmitting, by the first computing device and to the second computing device, an indication of the predetermined operation.

9. The method of claim 1, wherein determining the particular template graphical user interface is based at least in part on an operating state of the first computing device.

10. The method of claim 1, wherein the identification information indicates a type of the second computing device.

11. The method of claim 1,
wherein the state information includes information indicative one or more operational parameters of the second computing device, and
wherein the graphical user interface further includes information indicative of the one or more operational parameters of the second computing device.

12. A first computing device comprising:
a display device;
a short-range wireless communication unit;
at least one processor; and
memory comprising instructions that, when executed by the at least one processor, cause the at least one processor to:
receive, from a second computing device, via the short-range wireless communication unit, data including state information of the second computing device and identification information for the second computing device;
responsive to a distance between the first computing device and the second computing device satisfying a threshold distance:
establish a communication session between the first computing device and the second computing device;
determine, based on the identification information, a particular template graphical user interface from a plurality of template graphical user interfaces;
determine, based on the state information, one or more operations the second computing device is configured to perform;
output, using the particular template graphical user interface and for display by the display device, a graphical user interface associated with the second computing device and that includes one or more graphical elements that each correspond to a respective operation of the one or more operations the second computing device is configured to perform;
receive an indication of a user input selecting a particular graphical element of the one or more graphical elements; and
transmit, to the second computing device and via the communication session, an indication of the operation corresponding to the particular graphical element; and
after transmitting the indication of the operation to the second computing device and responsive to the distance between the first computing device and the second computing device no longer satisfying the threshold distance:
terminate the communication session; and
output, for display by the display device, an updated graphical user interface that does not include the graphical user interface associated with the second computing device.

13. The first computing device of claim 12, wherein the instructions further cause the at least one processor to:
determine, based on a characteristic of a signal received by the short-range wireless communication unit, the distance between the first computing device and the second computing device, the signal including the state information and the identification information; and
determine whether the distance between the first computing device and the first computing device satisfies the threshold distance.

14. The first computing device of claim 12, wherein the state information and the identification information is automatically received without the first computing device receiving a user input commanding the first computing device to establish the communication session with the second computing device.

15. The first computing device of claim 12, wherein the threshold distance is a first threshold distance, and wherein the instructions further cause the at least one processor to:
- further responsive to the distance between the first computing device and the second computing device satisfying the first threshold distance, output, for display by the display device, a graphical element indicating the first computing device is within the first threshold distance; and
- responsive to the distance between the first computing device and the second computing device satisfying a second threshold distance, output, for display by the display device, the graphical user interface that includes the one or more graphical elements that each correspond to a respective operation the second computing device is configured to perform.

16. A non-transitory computer-readable storage medium comprising instructions that, when executed by at least one processor of a first computing device, cause the at least one processor to:
- receive, from a second computing device, via a short-range wireless communication unit, data including state information of the second computing device and identification information for the second computing device;
- responsive to a distance between the first computing device and the second computing device satisfying a threshold distance:
  - establish a communication session between the first computing device and the second computing;
  - determine, based on the identification information, a particular template graphical user interface from a plurality of template graphical user interfaces;
  - determine, based on the state information, one or more operations the second computing device is configured to perform;
  - output, using the particular template graphical user interface, a graphical user interface associated with the second computing device and that includes one or more graphical elements that each correspond to a respective operation of the one or more operations the second computing device is configured to perform;
- receive an indication of a user input selecting a particular graphical element of the one or more graphical elements; and
- transmit, to the second computing device and via the communication session, an indication of the operation corresponding to the particular graphical element; and
- after transmitting the indication of the operation to the second computing device and responsive to the distance between the first computing device and the second computing device no longer satisfying the threshold distance:
  - terminate the communication session; and
  - output, for display, an updated graphical user interface that does not include the graphical user interface associated with the second computing device.

17. The non-transitory computer-readable storage medium of claim 16, wherein the instructions further cause the at least one processor to:
- determine, based on a characteristic of a signal received by the short-range wireless communication unit, the distance between the first computing device and the second computing device, the signal including the state information and the identification information; and
- determine whether the distance between the first computing device and the first computing device satisfies the threshold distance.

* * * * *